E. H. ROY.
MOUTH HAND MIRROR.
APPLICATION FILED MAY 7, 1919.
1,342,351.
Patented June 1, 1920.
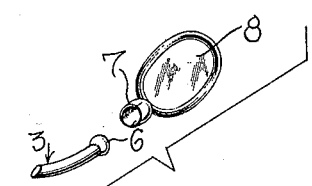
Inventor
E. H. Roy.
By Lacey & Lacey,
Attorneys.

UNITED STATES PATENT OFFICE.

EDWARD H. ROY, OF NASHVILLE, TENNESSEE.

MOUTH HAND-MIRROR.

1,342,351.  Specification of Letters Patent.  Patented June 1, 1920.

Application filed May 7, 1919. Serial No. 295,428.

*To all whom it may concern:*

Be it known that I, EDWARD H. ROY, a citizen of the United States, residing at Nashville, in the county of Davidson and State of Tennessee, have invented certain new and useful Improvements in Mouth Hand-Mirrors, of which the following is a specification.

This invention relates to hand mirrors and has as its primary object to provide a mirror by the use of which one may inspect the backs of one's teeth and, generally, the interior of the mouth in a more thorough and convenient manner than is possible by the use of the ordinary mirror.

Another object of the invention is to provide a hand mirror so constructed that the same may be adjusted so that various portions of the interior of the mouth may be observed without any inconvenience and without any straining of the eyes.

In the accompanying drawing:

Figure 1 is a perspective view illustrating the device embodying the present invention and the manner of using the same;

Fig. 2 is a perspective view illustrating one of the mirrors of the device and the means provided for mounting the same for universal adjustment.

In the drawings the numeral 1 indicates a handle which may be of any suitable material, size, and design and supported upon the upper end of this handle, preferably rigidly, is a mirror 2 occupying a plane with the handle whereby when the handle is held in the position illustrated in Fig. 1 of the drawings, the mirror will be supported upright facing the user of the device.

In addition to the mirror 2, the device embodies a mirror designed to be positioned within the mouth and this latter mirror which will presently be specifically described, is supported by an arm which is indicated by the numeral 3. The said arm 3 is bifurcated and pivotally connected as at 4 at its forward end to the shank of the handle 1 preferably by a frictional pivotal joint so that the arm may have swinging adjustment in an up and down direction. From its pivoted end the arm is preferably curved upwardly and rearwardly from that side of the device at which the reflecting face of the mirror 2 is presented, and preferably the intermediate portion of the arm is slightly bowed in a general upward direction as indicated by the numeral 5 so that the arm in entering the mouth may readily clear the lower row of teeth and the lower lip. At its rear extremity the arm is formed with a ball head 6 frictionally received within a socket 7 which is integrally connected with or formed upon the frame for the mouth mirror heretofore referred to, this mirror being indicated in general by the numeral 8. The mirror 8 is relatively small in size so as to be conveniently received within the mouth and by reason of the ball and socket joint provided between the mirror and the extremity of the arm 3, the said mirror is capable of a substantially universal adjustment, that is to say it may be tilted to either side or tilted forwardly or rearwardly.

Fig. 1 of the drawings illustrates clearly the manner of using the present device, the handle of the same being grasped in one hand as shown in the said figure and the arm 3 and mirror 8 being adjusted upon their respective joints to such an angle that when the mouth mirror 8 is held within the mouth facing in the general direction of the reflecting face of the mirror 2, it will receive and reflect an image of the rear of the upper row of teeth, the roof of the mouth, or some other portion of the interior of the mouth depending upon the angle to which the said mirror is adjusted, the reflected image being readily viewed by the user by looking into the mirror 2. In this manner one may readily ascertain the condition of his teeth or otherwise inspect the interior of his mouth or the device may be employed for example by dentists in demonstrating to patients diseased conditions of the teeth. As illustrated in Fig. 1, the arm 3 is tapered gradually toward the mirror 8 and is relatively thin at its forward end so that the same may readily enter the mouth. Also in tapering the arm toward the mirror 8 the mirrors may be more readily focused as the same are not interfered with by the arm.

Of course, sacrificing the advantages of the adjustable joint 4 between the arm 3 and handle 1 or the joint between the mirror 8 and the arm 3, either or both of the parts may be of an integral nature so as to permanently maintain a predetermined angle between the mirror 8 and the mirror 2.

Having thus described the invention, what is claimed as new is:

1. A device for examining the teeth including a handle, a mirror secured to the upper end of the handle, an arm horizontally pivoted at one end to the upper end of said handle, and a second mirror mounted for universal movement at the other end of said arm, said arm being bowed longitudinally to permit the second named mirror and the adjacent portion of the arm to enter the mouth in spaced relation to the teeth and lips.

2. A device for examining the teeth including a handle, a mirror secured to the upper end of the handle, an arm having one end portion bifurcated and pivoted to the upper end of said handle, and a second mirror mounted for universal adjustment at the other end of said arm, said arm being tapered toward said second named mirror to permit of the free entrance of the same into the mouth.

In testimony whereof I affix my signature.

EDWARD H. ROY. [L. S.]